United States Patent [19]

Nisenson

[11] 4,253,554
[45] Mar. 3, 1981

[54] BI-DIRECTIONAL CLUTCH

[75] Inventor: Jules Nisenson, New York, N.Y.

[73] Assignee: Nisenson Technology Corp., New York, N.Y.

[21] Appl. No.: 57,903

[22] Filed: Jul. 16, 1979

[51] Int. Cl.³ .............................................. F16D 67/02
[52] U.S. Cl. .................................... 192/8 R; 192/15; 192/38
[58] Field of Search ....................... 192/8 R, 15, 7, 44, 192/45, 38

[56] References Cited

U.S. PATENT DOCUMENTS

| 1,015,861 | 1/1912 | Warner | 192/8 R |
| 2,389,886 | 11/1945 | Bardega | 192/8 R |
| 3,243,023 | 3/1966 | Boyden | 192/44 X |

Primary Examiner—George H. Krizmanich
Attorney, Agent, or Firm—Gottlieb, Rackman & Reisman

[57] ABSTRACT

There is disclosed a bi-directional clutch which offers improved reliability. The three main elements are (a) a stationary, planar section having an upstanding circumferential wall, (b) a driving member having a rotatable planar section and an upstanding cylindrical wall around a central bore, the wall having radial slots and being positioned within the circumferential wall of the stationary member, and (c) a hexagonal-shaped member which is to be driven by the driving member, positioned in the bore of the driving member. A plurality of hollow cylindrical rollers are positioned within the slots of the driving member; opposite ends of each roller are adjacent to the planar surfaces of the stationary and driving members. A torque applied to the driving member, in either direction, causes the rollers to move and to bear against the hexagonal-shaped member to drive it. A torque applied to the hexagonal-shaped member, in either direction, causes the rollers to be wedged against the circumferential wall of the stationary member, thereby preventing the hexagonal-shaped member from turning. Should dirt cause the rollers to stick to the faces of the hexagonal-shaped member, the rollers tend to move with it instead of becoming wedged against the circumferential wall of the stationary member. To prevent this from happening, a spring is included within each hollow roller for bearing against the opposed planar sections of the stationary and driving members. The restraining forces thus introduced prevent the rollers from being moved by the hexagonal-shaped member even if they tend to stick to it.

3 Claims, 10 Drawing Figures

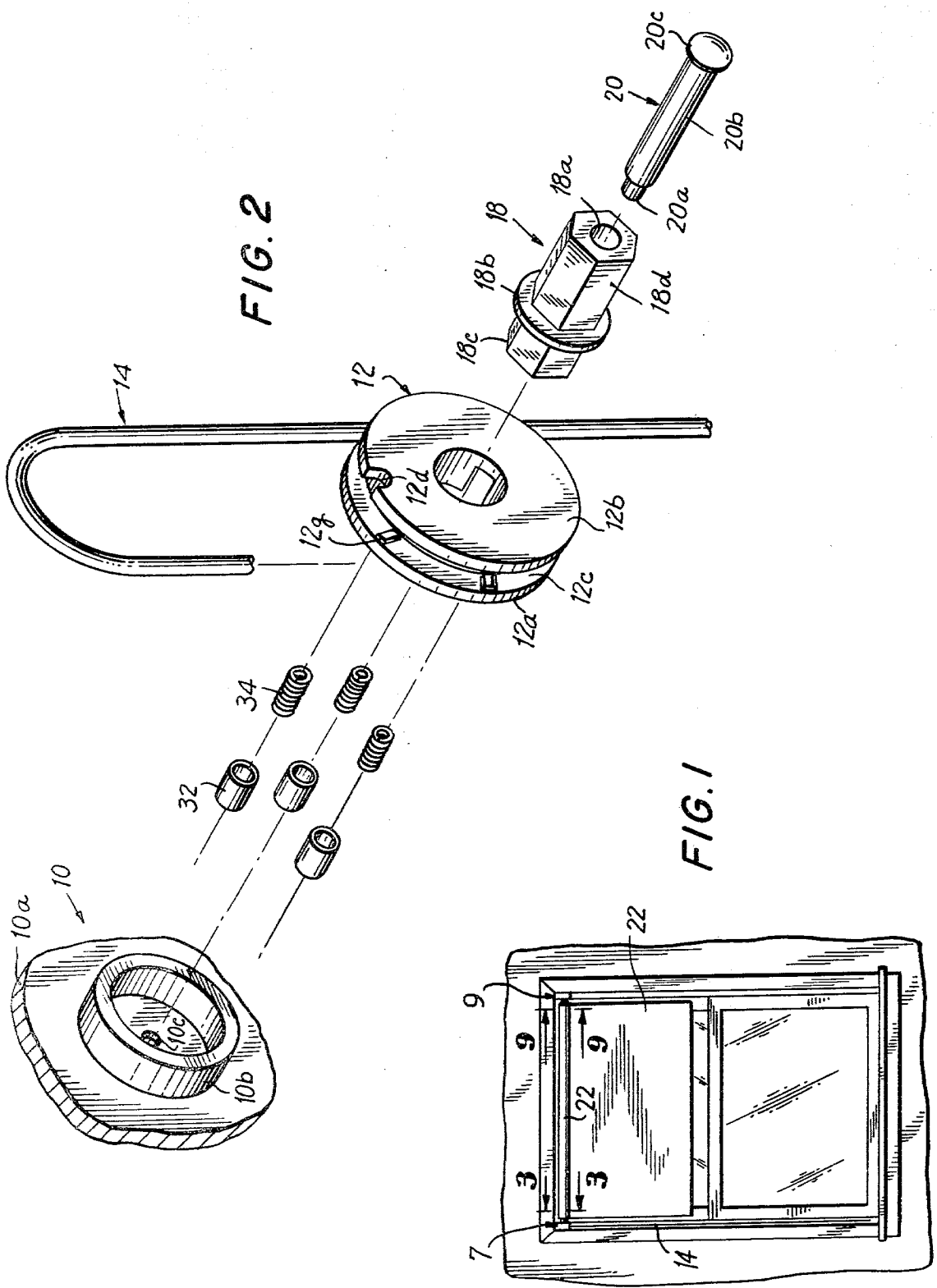

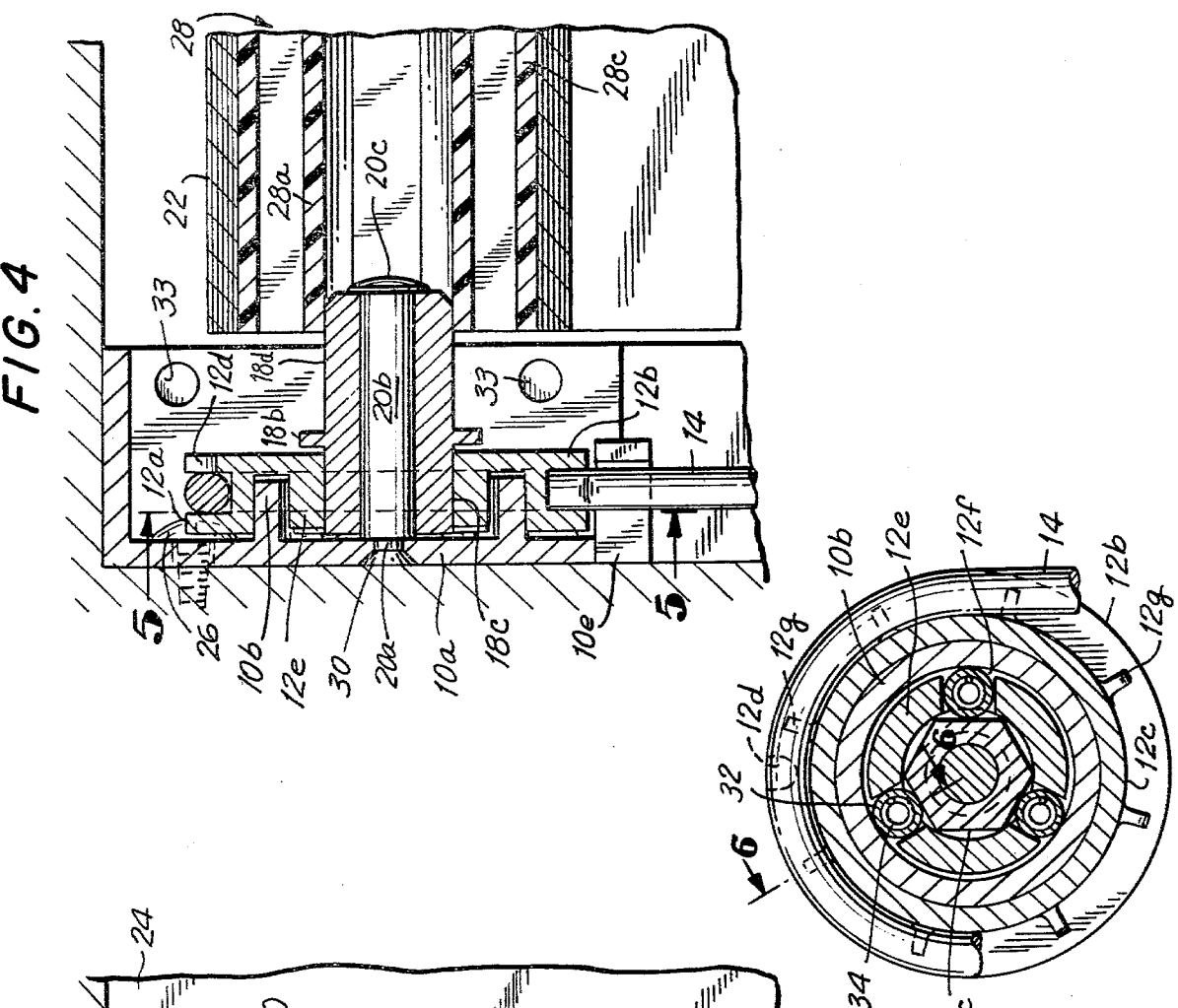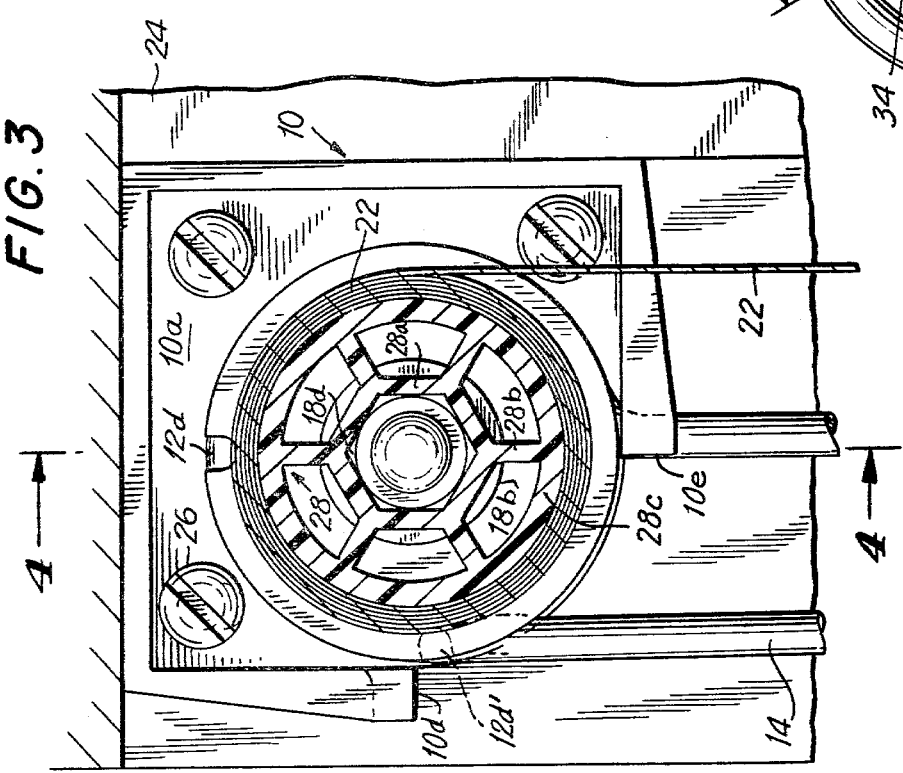

BI-DIRECTIONAL CLUTCH

This invention relates to bi-directional clutches, and more particularly to such clutches which offer improved reliability.

There are numerous applications for bi-directional clutches. A typical clutch includes a driving member and a driven member. A torque applied in either direction to the driving member causes it to turn, rotating the driven member along with it. But a torque applied directly to the driven member does not result in either member turning.

A typical application for such a bi-directional clutch is for use with window shades. Instead of using a conventional spring-loaded roller (which is prone to break), a bi-directional clutch may be used by attaching its driven member to a simple shade roller. The driving member may be provided with a cord loop for turning it in either direction. As the cord loop is pulled, the driven member and shade roller turn, and in this manner the shade can be opened or closed. Once the shade position is adjusted, the weight of the shade tends to turn the driven roller directly. But the application of a direct torque to the driven member does not result in its turning. The only way to adjust the shade height is by applying a direct torque via the cord loop to the driving member.

The type of bi-directional clutch toward which the present invention is directed is exemplified by the following four patents:

| Patent No. | Inventor | Date | Title |
| --- | --- | --- | --- |
| 836,035 | A.C. Hendricks | 11/13/1906 | Clutch Mechanism |
| 1,141,319 | H.G. Coykendall | 6/1/1915 | Drive Mechanism |
| 2,066,167 | G.E. Swartz | 12/29/1936 | Shaft Operating and Locking Device |
| 2,286,760 | C.H. Peterson | 6/16/1942 | Clutch |

The basic principles of operation of this type of prior art bi-directional clutch can be understood by considering the basic elements which comprise it. These elements are: (a) a stationary, planar section having an upstanding circumferential wall, (b) a driving member having a rotatable planar section and an upstanding cylindrical wall around a central bore, the wall having radial slots and being positioned within the circumferential wall of the stationary member, and (c) a hexagonal-shaped member which is to be driven by the driving member, positioned in the bore of the driving member. A plurality of cylindrical rollers are positioned within the slots of the driving member. A torque applied to the driving member, in either direction, causes the rollers to move and to bear against the hexagonal-shaped member to drive it. A torque applied to the hexagonal-shaped member, in either direction, causes the rollers to be wedged against the circumferential wall of the stationary member, thereby preventing the hexagonal-shaped member from turning.

In this type of prior art clutch, when the driving member is turned by the application of an external torque, individual sections of its upstanding cylindrical wall apply tangential forces to the rollers, and the rollers move with the driving member as it turns. As the rollers move, they bear against the faces of the hexagonal-shaped member, the driven element, and this element is forced to turn. (Instead of the element having six faces, it may have a different number of them.) But if the driven element tries to turn on its own, its faces apply substantially radial forces to the rollers. The rollers are forced outward and become wedged against the circumferential wall of the stationary member. The rollers become locked in place, and this in turn prevents the driven element from turning on its own.

The problem with this type of prior art clutch is that the rollers often stick to the driven element; over a period of months or years, accumulated dirt may cause the rollers to adhere to the faces of the driven element. In such a case, if an attempt is made to turn the driven element directly (e.g., by the weight of a shade), instead of the rollers being forced outwardly they simply move with the driven element. As they move, they bear against sections of the upstanding cylindrical wall of the driving member, and the driving member turns together with the driven member. There is no wedging effect and the driven element is not locked in place.

In accordance with the principles of my invention, I provide a mechanism for restraining the rollers such that they tend to remain fixed relative to the planar surfaces of the driving and driven elements, i.e., they are not pulled along by the driven element if the latter tries to turn on its own. In the illustrative embodiment of the invention, the restraint is introduced by springs which extend through the cylinders and bear against the opposed planar surfaces. The restraining force is not sufficient to prevent the driving element from pushing the rollers along with it, and thus turning the driven element. But if the driven element tries to turn on its own, the restraining forces of the springs are sufficient to overcome the dirt which adheres the rollers to the faces of the driven element. As soon as the driven element turns very slightly, and because the rollers are not dragged along with it, the rollers become wedged against the stationary circumferential wall. As soon as the driven element starts to turn on its own, the rollers are wedged in place and the motion ceases.

Further objects, features and advantages of my invention will become apparent upon consideration of the following detailed description in conjunction with the drawing, in which:

FIG. 1 depicts the application of the bi-directional clutch of my invention to window shade hardware;

FIG. 2 is an exploded perspective view of the main elements of the illustrative embodiment of the invention;

FIG. 3 is a sectional view through the assembled bi-directional clutch, taken along line 3—3 of FIG. 1;

FIG. 4 is a sectional view through line 4—4 of FIG. 3;

FIG. 5 is a sectional view through line 5—5 of FIG. 4;

Figure 8:
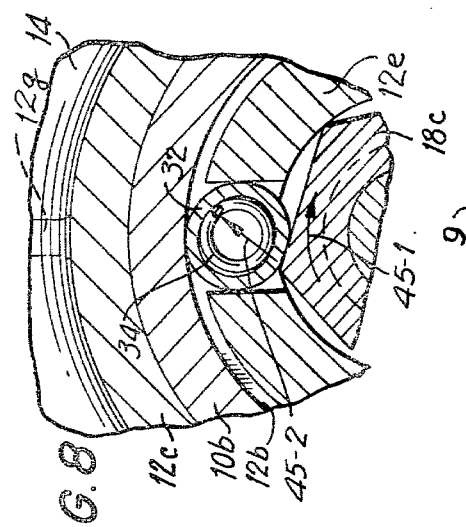
FIG. 8 is a sectional view (in highly exaggerated form) similar to that of FIG. 7 and depicts how the clutch operates when the driven element tries to turn on its own.

In FIG. 1, the numeral 8 represents a window frame. At the upper left corner of the frame there is mounted a bi-directional clutch 7. A mounting bracket 9 is positioned at the upper right corner of the frame. A roller extends between the clutch and the bracket, and a shade 22 is attached to the roller in the usual way and is shown partially wrapped around it. With the bi-directional clutch of the invention there is no need for a spring-biased roller. The roller is turned in either direction, to open or close the shade, by pulling cord 14 in the appropriate direction. The cord is a closed loop which extends through the clutch, as will become apparent below.

The main components of the clutch 7 are shown in exploded view in FIG. 2. The first element 10 (which is mounted to the window frame) is provided with a planar section 10a, and an upstanding circumferential wall 10b. A hole 10c is provided in flat section 10a, in the center of the circumferential wall. Element 10 is shown in its entirely in FIG. 3. Flat section 10a is bordered by an upstanding border section, having two ends 10d, 10e. Three screws 26 are used to mount member 10 to a side of the window frame. (As shown in FIG. 4, two holes 33 are provided for mounting member 10 on a rear surface of the frame, if desired.)

The second main member is driving element 12 (FIG. 2). Throughout this description, element 12 is referred to as the driving element and element 18—the third main member—is referred to as the driven element. Even when a case is considered in which forces tend to turn element 18 directly, rather than by element 12, element 18 is still referred to as the driven member.

Element 12 includes two face sections 12a, 12b and a groove 12c. Pulley cord 14 is contained within the groove. Referring to FIG. 5, the inner faces of sections 12a, 12b have small ridges 12g, the ridges alternating on the two faces. They serve to secure the pulley cord within the groove 12c so that there is no slippage. Face 12b is continuous except for a relatively small central bore through it. Face 12a, on the other hand, has a much larger central cut-out, as seen most clearly in FIGS. 4 and 5. Extending from planar section 12b is a cylindrical wall 12e. This wall is provided with radial slots 12f, as seen most clearly in FIG. 5.

The driving element 12 is placed on stationary member 10 with its slotted cylindrical wall 12e contained within the circumferential wall 10b. This is seem most clearly in FIGS. 4 and 5.

The third main element, driven member 18, has two hexagonal-shaped sections 18c, 18d, a central bore 18a, and a flange 18b. As shown in FIG. 4, section 18c is fitted within the central bore of the driving element 12. Pin 20 has its main shank 20b extended through the bore of the driven element. The pin terminates in a small section 20a having an internal thread. A hole 10c (FIG. 1) is provided in stationary member 10 for insertion of a screw 30 into the threaded end of the pin. The clutch, in its assembled condition (before it is mounted to the window frame), is thus held together by pin 20. Head 20c of the pin holds driven element 18 in place against the stationary member 10, and flange 18b holds the driving element 12 against the stationary member.

Three hollow rollers 32 (see FIGS. 2, 5 and 6) are positioned between face 12b of the driving element and face 10a of the stationary element. The rollers are positioned within the radial slots of cylindrical wall 12e. A spring 34 is positioned inside each roller. The springs bear against faces of sections 10a and 12b, as seen most clearly in FIG. 6. While the rollers 14 do not fit tightly between the two planar sections, the springs do. Were the rollers to fit tightly, it would be very difficult to turn the driving element relative to the stationary element. The springs, on the other hand, offer relatively little resistance. But because the springs are contained within the rollers, they apply a restraining force which holds the rollers in place, between the two facing planar sections, should the rollers tend to move under the influence of the driven element, as will be explained below.

FIGS. 3 and 4 both show window shade roller 28 with shade 22 wrapped around it. The roller is made of plastic and includes an outer cylinder 28c, ribs 28b, and a hollow hexagonal-shaped internal section 28a. This hollow section sits on section 18d of the driven element, so that they turn together.

Before proceeding to a description of the operation of the clutch, the purpose of notch 12d in the driving element (FIG. 2) should be appreciated. The notch is provided so that a pulley cord 14 can be placed in groove 12c even when the unit is fully assembled. Referring to FIG. 3 it will be noted that ends 10d, 10e of the outer rim of the stationary member are separated only slightly from the periphery of the driving element 12. There is no room to squeeze the cord in past the edges 10d, 10e in order to place it in the groove 12c. (This insures that the cord does not slip off the pulley.) However, when the notch 12d is positioned as shown by the phantom lines 12d' in FIG. 3, the pulley cord can be placed in the groove and then rotated with the driving element past edge 10d. In this manner, the pulley cord can be replaced (an old one removed and a new one inserted) without disassembling the clutch elements.

Referring to FIG. 5, when cord 40 is pulled in either direction, driving element 12 turns with it. As the sections of wall 12e rotate, they apply tangential forces to rollers 32. The rollers bear against respective flat faces on section 18c of the driven element, and cause the latter to turn. This is shown most clearly in FIG. 7. When cord 14 is pulled in the direction of arrow 40-1, the driving element moves in the direction of arrow 40-2. As sections 12e turn, the leftmost section in FIG. 7 applies a force to roller 32 which causes it to move in the direction of arrow 40-3. As soon as the roller moves slightly, it applies a force to the driven element 18 in the direction of arrow 40-4. It is in this manner that the driven element can be turned by pulling on the cord. It will be apparent that pulling on the cord in the opposite direction causes the driven element 18 to turn in this opposite direction, in the same manner.

FIG. 8 depicts, in exaggerated form, what happens when a torque is applied directly to the driven element 18. As the element starts to move in the direction of arrow 45-1, a force is applied by it to roller 32, in the direction of arrow 45-2. The roller is wedged up against stationary circumferential wall 10b. With the roller thus wedged or locked in place, the driven element can no longer turn. The same effect occurs if a torque is applied directly to the driven element in the opposite direction. It should be appreciated that the drawing of FIG. 8 is greatly exaggerated and is designed to show the principles of operation only. The driven element 18 does not move to the extent shown in FIG. 8 (relative to its position in FIG. 7), nor does roller 32 distort to the degree shown in FIG. 8. The driven element moves only very slightly before all of rollers 32 become wedged and prevent any further motion.

Figure 7:
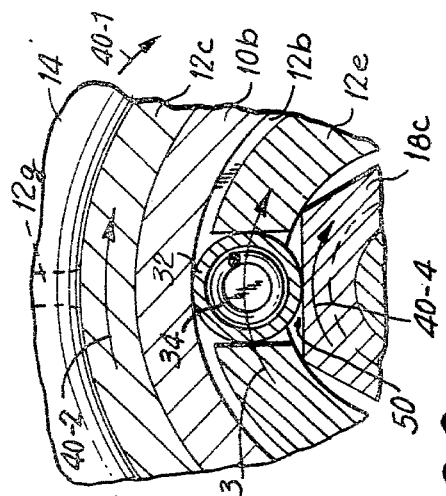
FIG. 7 is a sectional view through line 7—7 of FIG. 6 and depicts how the clutch operates when the driving element is turned.

The reliability problem, without using springs 34, can be appreciated by examining FIGS. 7 and 8. The problem arises from dirt which accumulates in the vicinity designated by numeral 50 the dirt, especially if it is greasy, tends to cause roller 32 to stick to driven element 18. Suppose now that a torque is applied directly to the driven element. What is desired is that the driven element turn just a bit relative to the roller so that a force 45-2 (FIG. 8) having a radial component be developed in order to wedge the roller against the stationary element. But if roller 32 actually turns with driven element 18 because the two are stuck together, there will be no wedging effect. Instead, all that will happen is that the roller will apply a tangential force to the rightmost section 12e in FIG. 7, the element 12 thus being pushed along with element 18. In the case of window shade hardware, this means that the window shade can close on its own.

Figure 6:
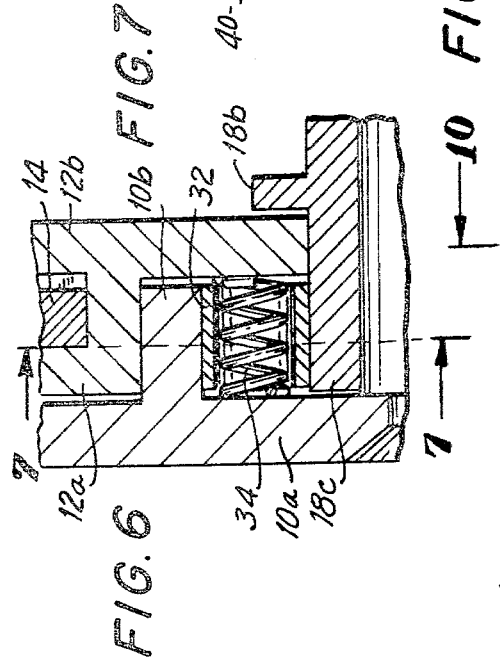
FIG. 6 is a sectional view through line 6—6 of FIG. 5.

But there is no such problem when springs 34 are placed in the rollers. Referring to FIG. 6, spring 34 bears against planar sections of stationary element 10 and driving element 12. Referring to FIG. 7, this has a tendency to hold roller 32 in place as element 18 starts to turn on its own. The restraining force developed by spring 34 bearing against the two planar sections overcomes the dirt "stickiness"; the bond of the roller to the driven element is not sufficient to overcome the restraining force introduced by the spring. The driven element 18 turns slightly without pulling the roller along with it, and immediately the roller is wedged against the stationary member.

Of course, the restraining force of the spring in each roller should not be so large that the roller is locked in place permanently. Otherwise, it would not be possible to turn the driving element because it would be locked to the stationary element by the springs. But the restraining forces of the springs are so small that there is practically no discernible difference in the force required to turn the driving element whether the springs are included in the unit or omitted. The restraining forces introduced by the springs are very weak. They are sufficient only to overcome the adhesion of the rollers to the driven element.

Although spring restraining forces are developed in the unit of the invention, other means for doing the same thing are contemplated. In general, the object is to bias each roller (or at least one of them) in a fixed position relative to the stationary and driving elements.

Figure 10:
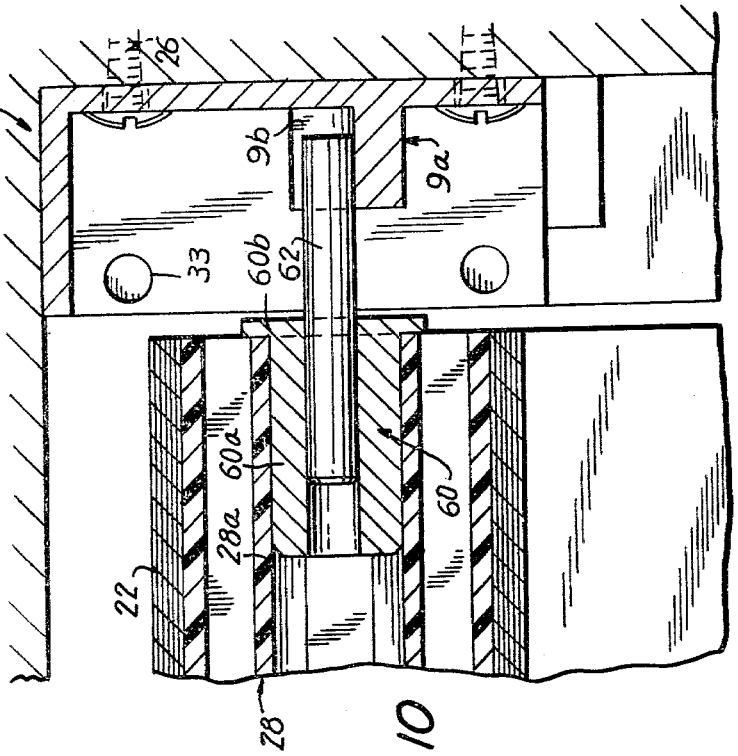
FIG. 10 is a sectional view through line 10—10 of FIG. 9.
Figure 9:
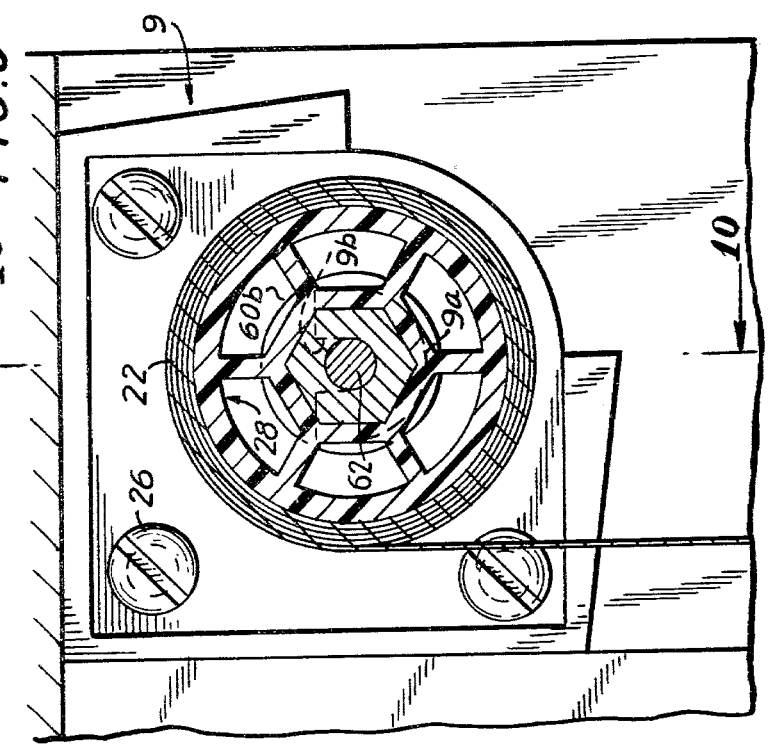
FIG. 9 is a sectional view through line 9—9 of FIG. 1 and depicts the hardware employed at the other end of the window shade roller.

FIG. 9 depicts a bracket which may be used at the other end of a window shade roller to mount it in place, with FIG. 10 being a view through the line 10—10 of FIG. 9. The bracket 9 has a shape similar to that of stationary element 10. But instead of a circumferential wall 10b (FIG. 1), it is provided with a bracket 9a, having a central groove 9b which faces upwardly. A pin 62 fits within this groove. Insert 60 has a shank 60a which can be fitted into an end of roller 28, flange 60b bearing against the end of the roller. Pin 62 extends into a central bore of insert 60.

All of the elements used are preferably made of plastic, except for springs 34, pin 62, pin 20 and the several screws. (Instead of using a pin 20 with a tip 20a into which a screw 30 is inserted (see FIG. 4), pin 20 may be riveted in place.) The springs in the illustrative embodiment of the invention each have five turns and are made of 0.005" bronze spring wire. To appreciate the relative dimensions of all of the elements, the springs fit loosely within the rollers and have a maximum outer diameter of 0.125" and a length of 0.312". The preferred plastic is polycarbonate, of which Lexan plastic is an example. When used in window shade hardware, for example, in which case the elements may be continuously exposed to sunlight, the elements may have to withstand high temperatures and they should not deteriorate with ultraviolet radiation; polycarbonate materials are suitable for such applications.

At least two rollers should be used for proper balancing of the unit. However, a spring need be included in only one of the rollers, since all it takes to stop the driven element from turning is for one of the rollers to become wedged against the stationary circumferential wall.

Although the invention has been described with reference to a particular embodiment it is to be understood that this embodiment is merely illustrative of the application of the principles of the invention. Thus it is to be understood that numerous modifications may be made in the illustrative embodiment of the invention and other arrangements may be devised without departing from the spirit and scope of the invention.

I claim:

1. A bi-directional clutch comprising a first member having a planar section and a circumferential wall upstanding therefrom; a second member having a planar section and a cylindrical wall upstanding therefrom, said cylindrical wall being provided with a bore and radial slots; said cylindrical wall of said second member being positioned within said circumferential wall of said first member; a plurality of hollow cylindrical rollers positioned within said slots and having opposite ends adjacent to said planar sections of said first and second members; a third member positioned within the bore of said cylindrical wall of said second member and having a section with a plurality of flat surfaces, at least some of which are adjacent to said rollers; means for applying a torque to said second member for turning it in either direction relative to said first member, a torque applied to said second member in either direction causing said rollers to turn with said second member and to bear against respective flat surfaces of said third member to turn said third member with said second member, a torque applied to said third member in either direction causing said flat surfaces to wedge said rollers against said circumferential wall of said first member thereby preventing turning of said third member; and spring means in each of said hollow cylindrical rollers for bearing at opposite ends against the respective planar sections of said first and second members.

2. A bi-directional clutch comprising a first member having a planar section and a circumferential wall upstanding therefrom; a second member having a planar section and a cylindrical wall upstanding therefrom, said cylindrical wall being provided with a bore and radial slots; said cylindrical wall of said second member being positioned within said circumferential wall of said first member; a plurality of cylindrical rollers positioned within said slots and having opposite ends adjacent to said planar sections of said first and second members; a third member positioned within the bore of said cylindrical wall of said second member and having a section with a plurality of flat surfaces, at least some of which are adjacent to said rollers; means for applying a torque to said second member for turning it in either direction relative to said first member, a torque applied to said second member in either direction causing said rollers to turn with said second member and to bear against respective flat surfaces of said third member to turn said third member with said second member, a torque applied to said third member in either direction causing said flat surfaces to wedge said rollers against said circumferential wall of said first member thereby preventing turning of said third member; and means associated with each of said rollers for restraining it from moving between the planar sections of said first and second members along with said third member when said third member starts to turn responsive to the application thereto of a torque.

3. A bi-directional clutch comprising a first member having a circumferential wall; a second member having a cylindrical wall with a bore and at least two radial slots; said cylindrical wall of said second member being positioned within said circumferential wall of said first member; at least two cylindrical rollers positioned within said at least two slots; a third member positioned within the bore of said cylindrical wall of said second member and having a section with at least two flat surfaces adjacent to said at least two rollers; and means for applying a torque to said second member for turning it in either direction relative to said first member; a torque applied to said second member in either direction causing said rollers to turn with said second member and to bear against respective flat surfaces of said third member to turn said third member with said second member, a torque applied to said third member in either direction causing said flat surfaces to wedge said rollers against said circumferential wall of said first member thereby preventing turning of said third member; and means for restraining at least one of said rollers from moving between said first and second members along with said third member when said third member starts to turn responsive to the application thereto of a torque.

* * * * *